United States Patent
Wicklund

(12)
(10) Patent No.: US 6,209,572 B1
(45) Date of Patent: Apr. 3, 2001

(54) DEVICE FOR REPAIRING DRAINS

(76) Inventor: Dale Alan Wicklund, Box 211, Greenbush, MN (US) 56726

( * ) Notice: Subject to any disclaimer, the term of this patent is extended or adjusted under 35 U.S.C. 154(b) by 0 days.

(21) Appl. No.: 09/373,446

(22) Filed: Aug. 12, 1999

(51) Int. Cl.⁷ ............ F16K 43/00; B01D 35/02; E03C 1/12
(52) U.S. Cl. ............ 137/315.01; 4/286; 4/288; 4/290; 52/127.4; 52/127.9; 52/127.12; 210/165; 210/232; 210/460
(58) Field of Search ............ 4/286, 287, 288, 4/292, 295, 290, 291; 137/15.01, 15.08, 315.01, 433; 285/56, 58, 14; 52/127.3, 127.4, 127.9, 127.11, 127.12; 210/164, 165, 166, 232, 248, 459, 460; 405/42, 43, 45

(56) References Cited

U.S. PATENT DOCUMENTS

| | | | |
|---|---|---|---|
| 342,452 * | 5/1886 | McEntee | 4/288 |
| D. 402,354 | 12/1998 | Strong et al. | D23/259 |
| 989,405 * | 4/1911 | Payne | 4/292 |
| 1,253,406 * | 1/1918 | McNeil | 4/288 |
| 1,753,724 * | 4/1930 | Shaw | 137/433 |
| 2,896,223 * | 7/1959 | Treslo | 4/286 |
| 3,327,326 * | 6/1967 | Friedman | 4/286 |
| 3,383,715 * | 5/1968 | De Young | 4/288 |
| 3,509,586 * | 5/1970 | Politz | 4/292 |
| 4,088,149 * | 5/1978 | Logsdon | 137/433 |
| 4,109,939 * | 8/1978 | Roberts | 285/8 |
| 4,146,939 | 4/1979 | Izzi | 4/286 |
| 4,310,933 | 1/1982 | Stratman | 4/286 |
| 4,329,744 * | 5/1982 | Cuschera | 4/286 |
| 4,332,393 * | 6/1982 | Cuschera | 4/292 |
| 4,423,527 | 1/1984 | Morris et al. | 4/288 |
| 4,455,693 * | 6/1984 | Cuschera | 4/286 |
| 4,505,814 * | 3/1985 | Marshall | 210/166 |
| 4,622,703 * | 11/1986 | Cuschera | 4/292 |
| 4,984,309 * | 1/1991 | Cuschera | 4/288 |
| 5,330,811 | 7/1994 | Buchalter | 428/40 |
| 5,372,715 * | 12/1994 | Maggard et al. | 210/165 |
| 5,630,235 | 5/1997 | Angstadt | 4/583 |
| 5,692,248 | 12/1997 | Ball | 4/286 |
| 5,745,931 | 5/1998 | Ball | 4/286 |

\* cited by examiner

*Primary Examiner*—George L. Walton
(74) *Attorney, Agent, or Firm*—Curtis V. Harr

(57) ABSTRACT

A coupling system that can be placed into the existing drain and over the existing drain pipe to effect a repair without removal of an existing tub, shower or similar receptacle. The drain coupling system is self-sealing and can be locked into place from above. After ensuring that the proper seal is obtained between the invention and the drain pipe, the body of the invention is pushed downward until the upper collar lip engages the floor surrounding the drain opening. The system is then secured in position from above by the plurality of hex head set screws provided. The hex head set screws extend downward from the upper most surface of the invention. The coupling system is supplied with locking tabs. When the present invention is in the proper position within the drain opening, the rotation of the screws forces the wings of the locking tabs to rotate in a lateral fashion. The rotation of the locking tab continues until the wings contact the walls of the drain opening. The contact between the locking tabs and the drain walls serves to securely hold the invention in the proper orientation within the drain hole.

12 Claims, 4 Drawing Sheets

DEVICE FOR REPAIRING DRAINS

BACKGROUND OF THE INVENTION

The present invention relates to an improvement in the method employed to repair leaking shower and bathtub drains common in households today. More specifically, to a method of repairing such drains that does not require that the shower stall or bathtub be removed to allow for the removal and repair of a leaking drain.

In the past, the replacement of worn out and leaking shower and bathtub drains has posed significant problems for home and property owners. This problem primarily resulted from the design of these components, as they were typically made of a threaded tube with a flange at its upper most end. During the original installation process, this tube is passed down and through the drain opening of the shower or bathtub until the flange contacts the upper surface of the shower floor, prior to the installation of the shower or tub. The assembly is then held in place by threading a large nut onto the threaded pipe from the bottom side until it contacts the bottom surface of the shower or bathtub. Until recently, these components were also made entirely of common metals such as iron and steel that are prone to problems resulting from corrosion.

The problem with this design is a direct result of the constant presence of water on these components. This water exposure substantially increases the probability that they will eventually fail, causing the system to leak water into the structure of which they are a part. In the past, the only way to cure this common problem was to remove the entire shower stall or bathtub and replace the drain with similar components. Then place the shower or tub in its original position. Due to the complexities, specific tooling needed, and skill involved in replacing traditional drains, most home and property owners were forced to hire a contractor to handle the often expensive job.

The sole benefit of the old metallic drain components was that upon corroding to the point of leaking water, the components have rusted to the extent that they can easily be broken out of the drain hole without having to remove the complete shower stall or bathtub. Thus, if a device could allow for the replacement of the drain without the removal of the stall or bathtub to replace the retaining nut holding the drain assembly to the stall, it would be a much simpler and economical drain replacement process.

From this it can be seen that it would be desirable to provide a method of replacing corroded and leaking shower and bathtub drains that would not require the shower stall or tub to be removed. Such a device would allow a person of average mechanical abilities to quickly and inexpensively replace a leaking shower or bathtub drain without the expense and trouble of hiring a contractor. Additionally, it will also allow contractors to replace drains quickly, reducing the cost for individuals who need to hire a contractor to fix the drain problem.

SUMMARY OF THE INVENTION

It is the primary objective of the present invention to provide a method of replacing corroded and leaking shower and bathtub drains.

It is an additional objective of the present invention to provide such a method which will not require the removal of the shower stall or bathtub to effect the replacement of these components.

It is a further objective of the present invention to provide such a method that will allow persons of ordinary mechanical abilities to make this replacement without having to hire a contractor to do so.

It is a further objective of the present invention to provide such a method that is substantially more economical than prior methods of drain replacement.

These objectives are accomplished by the use of a drain, coupling system that can be placed into the existing drain and over the existing drain pipe. The drain coupling system is self sealing and can be locked into place from above. The process of replacing an old, corroded and leaking drain coupler with the present invention is accomplished by removing the existing coupler from the drain pipe at the bottom of the shower stall or bathtub. As previously stated, this is normally a simple operation since the leaking drain coupler is so corroded that it is easily removed by applying upward pressure and pulling it free of the drain pipe.

After the old drain coupler has been removed, any remaining pieces of the old drain must be cleared from the drain hole and existing drain pipe. Removal is needed to verify that the present invention will seat properly within the drain hole and over the drain pipe. Once these procedures have been accomplished, the present invention is then fitted over the existing drain pipe. During this process, the installer must ensure that the two drain seal O-rings are properly seated between the body of the invention and the drain pipe. Proper fitting of these components is crucial so that all of the water passes down the drain pipe and does not escape into the floor space.

After ensuring that the proper seal is obtained between the invention and the drain pipe, the body of the invention is then pushed downward until the upper collar lip engages the floor surrounding the drain opening of the shower stall or bathtub. The collar lip is then sealed to the floor by the use of a special purpose adhesive, such as a silicone bath caulk, which should be used liberally during the installation to ensure that no water can pass between two surfaces.

After these installation steps have been accomplished, the installer then secures the invention in position with the plurality of hex head set screws provided. The hex head set screws extend downward from the upper most surface of the invention, where they are mounted within recesses below flush with the upper surface. The screws are advanced to the collar tab depression below where they are fixedly attached to the locking tabs. The locking tabs are generally winged-shaped apparatuses that can be pivoted to force their winged portions to extend laterally. This pivoting action is obtained by placing an appropriate tool into the head of the screw and rotating it in the proper direction. When the present invention is in the proper position within the drain opening, this rotation of the screws forces the wings of the locking tabs to rotate in a lateral fashion. The rotation of the locking tab continues until the wings contact the walls of the drain opening. The contact between the locking tabs and the drain walls serves to securely hold the invention in the proper orientation within the drain hole. Finally, the installation of the invention is completed by placing the provided drain cover over the top of the invention, thus covering the drain hole while allowing water to freely pass through it.

For a better understanding of the present invention, reference should be made to the drawings and the description in which there are illustrated and described preferred embodiments of the present invention.

DESCRIPTION OF THE PREFERRED EMBODIMENT

Figure 1:
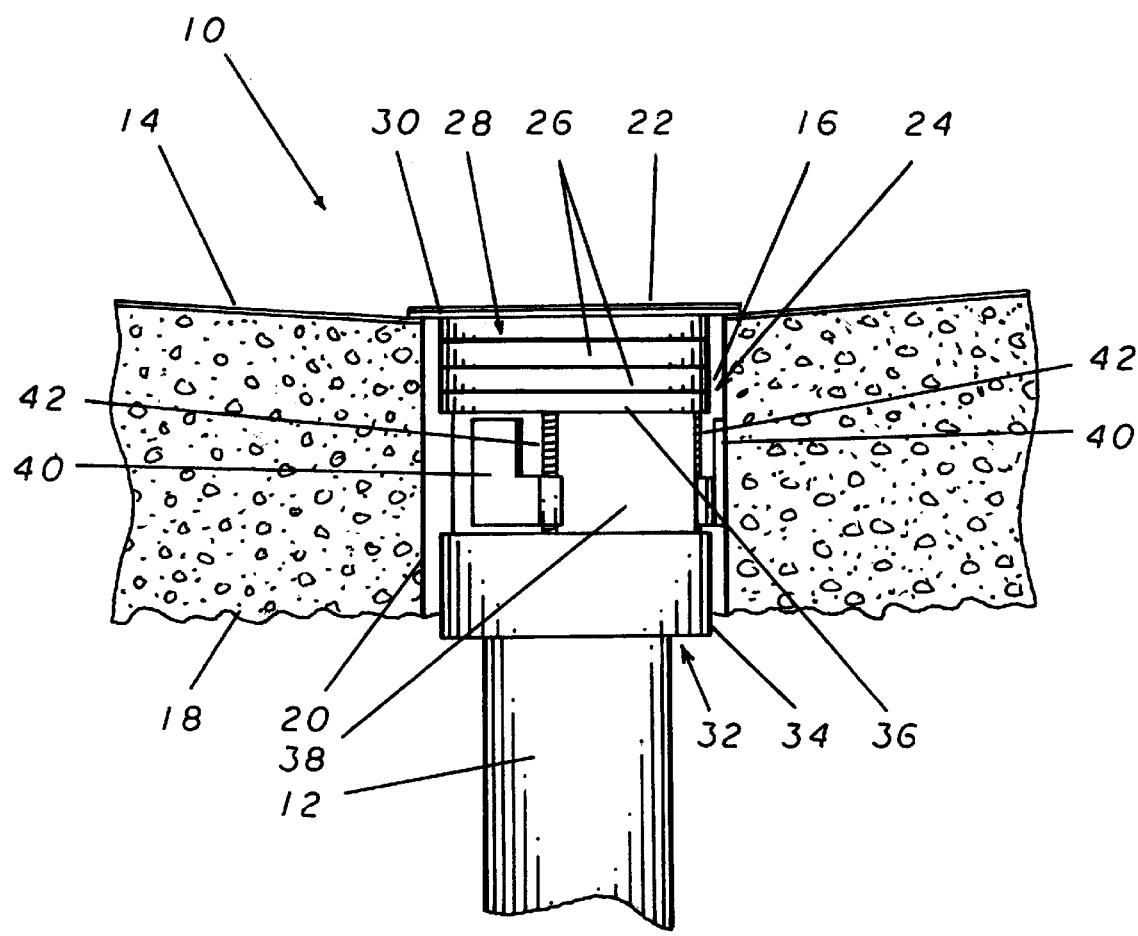
FIG. 1 is a side elevation cut-away view of the present invention illustrating it as installed in the drain of a typical shower stall.
Figure 2:
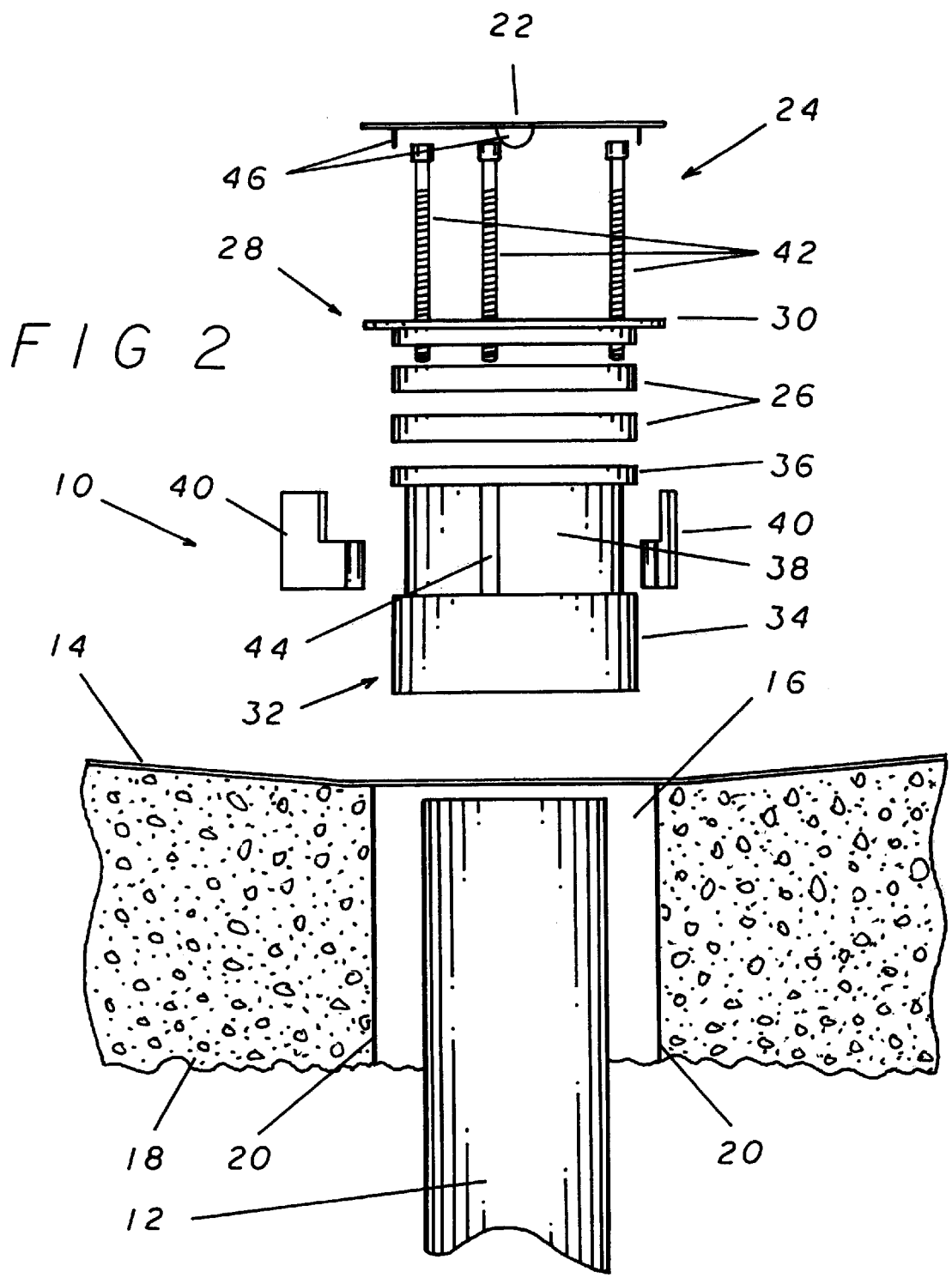
FIG. 2 is a side elevation cut-away exploded view of the present invention showing the manner in which its major components fit together to form a sealed shower or bathtub floor drain.
Figure 3:
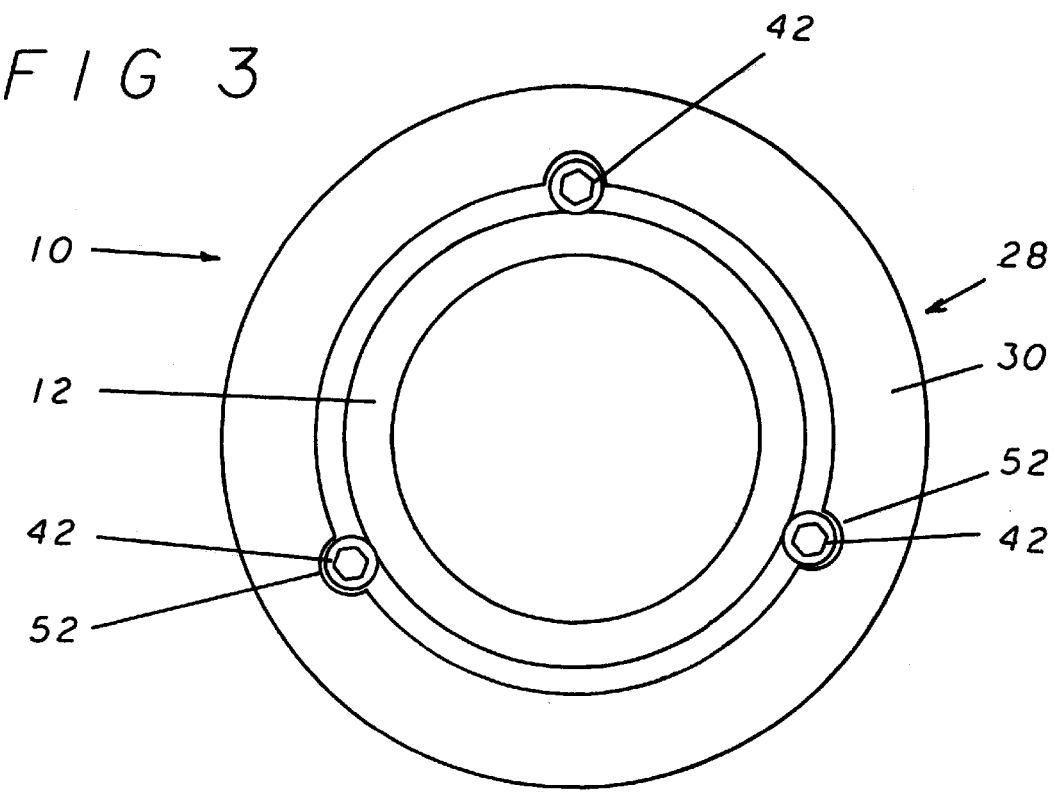
FIG. 3 is a top elevation view of the present invention detailing the orientation of the upper collar and set screws in relation to the original drain pipe.
Figure 4:
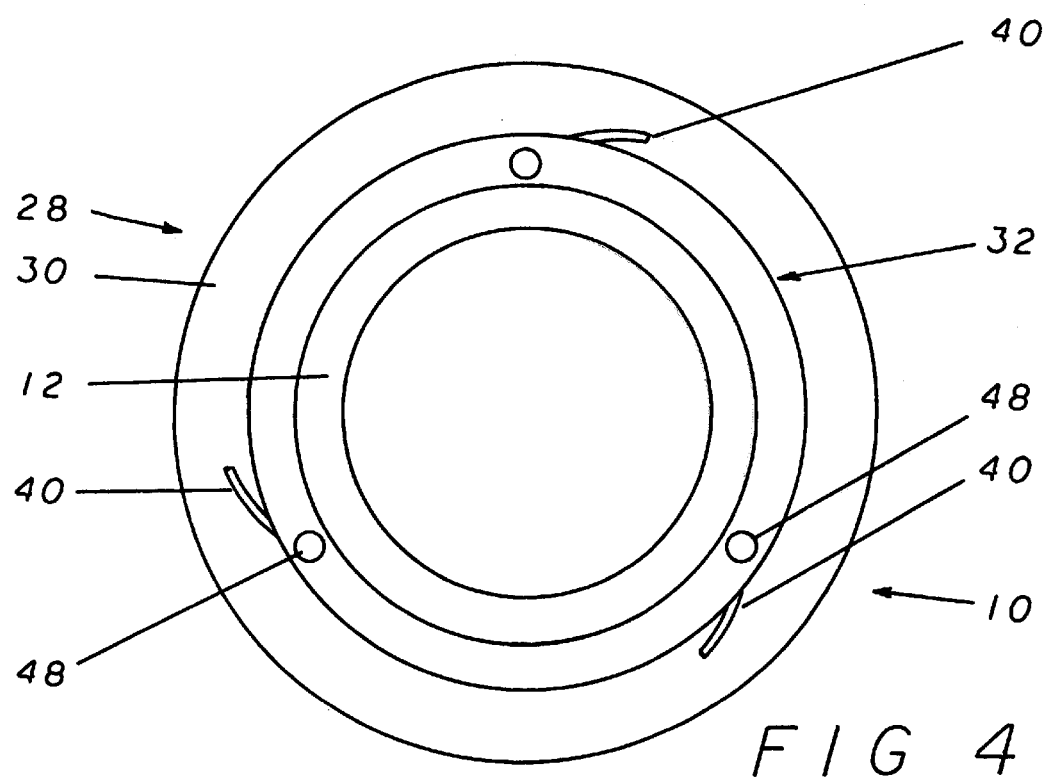
FIG. 4 is a bottom elevation view of the present invention detailing the orientation of the upper collar and set screws in relation to the original drain pipe.
Figure 5:
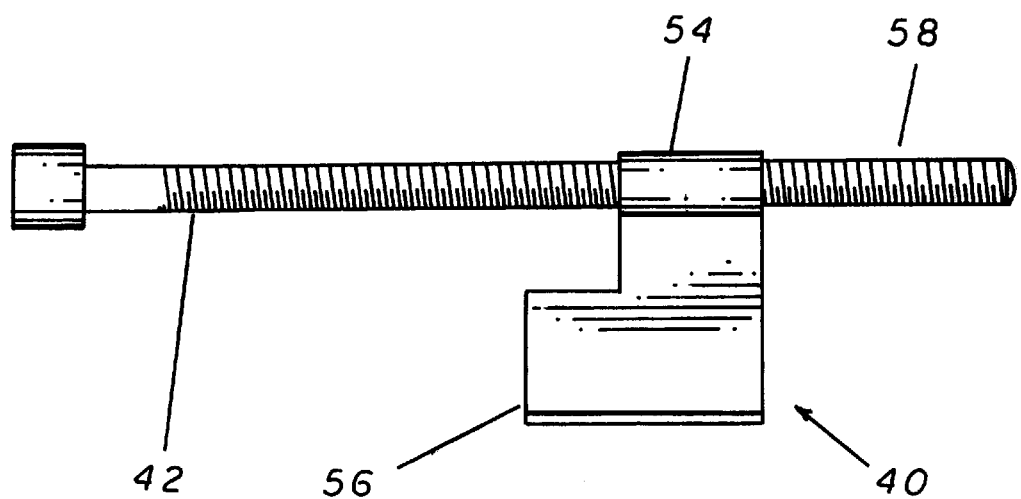
FIG. 5 is a side elevation view of the set screw and expansion tab components of the present invention detailing their manner of construction.

Referring now to the drawings, and more specifically to FIGS. 1 and 2, the shower and bathtub drain repair unit 10 is a drain coupling system that is used to replace an existing leaking drain. The system can be placed into the drain hole 16, over the existing drain pipe 12, and it is self sealing and can be locked into place from above. This allows the invention to be used to repair a leaking shower or bathtub drain without removing either them from their place of installation, allowing repairs to be made easier and more economical.

The present invention is made of a drain collar body 24 which encompasses a plurality of individual components used to seal off the drain hole 16, located in the floor 18 of a typical shower stall, bathtub, mop-sink or other similar service sink. It should also be stated at this point that the invention may be equally useful on many types of sinks or floor drains. The process of replacing an old, corroded and leaking drain coupler with the present invention is initiated by removing the existing coupler from the existing drain pipe 12 at the bottom of the shower stall or bathtub. After the old drain coupling has been removed, any remaining pieces of the old drain coupling must be cleaned from the drain hole 16 and existing drain pipe 12. Removal is needed to assure that the present invention will seat properly within the drain hole 16 and over the existing drain pipe 12.

Once these procedures have been accomplished, the present invention is then fitted over the existing drain pipe 12. During this process, the installer must ensure that the two drain seal O-rings 26, located towards the top of the drain collar body 24 between the upper collar assembly 28 and the lower collar top 36 of the lower collar assembly 32, are properly seated between the drain collar body 24 and the drain pipe 12. The drain seal O-rings 26 provide a water tight seal between the inner wall of the drain collar body 24 and the outer wall of the existing drain pipe 12. The proper seating of the drain seal O-rings 26 over the existing drain pipe 12 is crucial since this seal ensures that water does not escape into the drain hole 16 which would, if done improperly, continue the leaking problem that one is trying to fix with the installation of the present invention.

The upper collar assembly 28 has an outwardly extending upper collar lip 30 at its most upward end. The purpose of the upper collar lip 30 is to provide a method of covering and sealing off the portion of the upper end of the drain hole 16 which is not completely filled and covered by the drain collar body 24. The upper collar lip 30 is a thin outwardly extending protrusion of the upper collar assembly 28 which is constructed to be of a sufficient circumference to cover the opening of the drain hole 16 and engage the surface of the floor liner 14 that covers the floor 18 and surrounds the drain hole 16. The point of attachment of the upper collar lip 30 and the floor liner 14 is also sealed with the use of a special purpose adhesive, such as a silicone bath caulk (not shown) to ensure that no water can enter the drain hole 16 between them. Finally, a drain cover 22 is frictionally attached to the upper most and inner surface of the upper collar assembly 28 by the use of a plurality of drain cover tabs 46 which extend downward from the lower surface of the drain cover 22. The drain cover 22 is a flat perforated disc which allows water to freely pass through it, while keeping larger objects, such as soap and jewelry, from falling into the existing drain pipe 12.

The lower collar assembly 32, comprises the bulk of the body of the invention and is located between its upper surface (known as the lower collar top 36) and the lower surface of the upper collar assembly 28. The drain seal O-rings 26 are positioned and held between these components to provide the necessary seal which is critical to the purpose of the invention. The lower collar assembly 32 also houses the collar tab depression 38, which is a shallow and relatively wide machined groove in the lower collar assembly 32, located between the lower collar top 36 and the lower collar base 34. The collar tab depression 38 provides the point of attachment for the expansion locking tabs 40 which are used to secure the entire invention within the drain hole 16. The expansion locking tabs 40 are secured within the collar tab depression 38 by the use of the hex head set screws 42 which extend downward from the upper most surface of the upper collar assembly 28 into the collar tab depression 38. Additionally, within the collar tab depression 38, the hex head set screws 42 fit within the set screw grooves 44, which are vertical depressions in the face of the collar tab depression 38 which allow the hex head set screws 42 to be placed deeply enough in the collar tab depression 38 so that the edges of the hex head set screws 42 do not protrude beyond the outer surface of the lower collar assembly 32. This design ensures that the hex head set screws 42 will not interfere with the invention's position within the drain hole 16.

As previously stated, the expansion locking tabs 40 are the components of the present invention that are used to secure the invention within the drain hole 16. This securement function is accomplished by the workings of the hex head set screws 42 and the expansion locking tabs 40 to engage the hole wall 20 of the drain hole 16.

After these installation sets have been accomplished, the installer then secures the invention in position with the plurality of hex head set screws 42 provided. The hex head set screws 42 extend downward from the upper most surface of the invention, where they are mounted within recesses to be flush with the upper surface. The screws are advanced to the collar tab depression 38 where they are fixedly attached to the expansion locking tabs 40. The expansion locking tabs 40 are generally winged-shaped apparatuses that can be pivoted to force their winged portions to extend laterally. This pivoting action is obtained by placing an appropriate tool into the head of the hex head set screw 42 and rotating it in the proper direction. When the present invention is in the proper position within the drain hole 16, this rotation of the hex head set screws 42 forces the wings of the expansion locking tabs 40 to rotate in an outward fashion. The rotation of the locking tab continues until the wings of the expansion locking tabs 40 contact the walls of the drain hole 16. The contact between the expansion locking tabs 40 and the drain hole walls 20 serves to securely hold the invention in the proper orientation within the drain hole 16. Finally, the installation of the invention is completed by placing the provided drain cover 22 over the top of the invention, thus covering the drain hole 16 while still allowing water to freely pass through it.

Although the present invention has been described in considerable detail with reference to certain preferred versions, other versions are possible. Therefore, the spirit and scope of the appended claims should not be limited to the description of the preferred versions contained herein.

What is claimed is:

1. A drain repair apparatus for use in a water receptacle defining a drain hole installed over a drain pipe said drain repair apparatus comprising:
    a lower collar assembly for placement through said drain hole and about said drain pipe;
    an upper collar assembly having flange section larger than said drain hole;
    at least two or more tabs pivotally attached to the outside of said lower collar assembly along an axis parallel to said drain pipe; and
    at least two or more fastener in a rotational engagement with said tabs such that said fasteners connect said upper assembly to said lower assembly whereby the rotation of said fasteners engages and moves said tabs in an outward fashion such that said repair apparatus is held in a desired position within said drain hole by said tabs.

2. A drain repair apparatus as in claim 1 wherein said tabs have a threaded female portion.

3. A drain repair apparatus as in claim 2 wherein said fasteners are threaded and pass through said upper assembly, and into said lower assembly and are threaded through said threaded female portion of said tabs.

4. A drain repair apparatus as in claim 3 further comprising a ring shaped seal portion placed between said upper and lower collar assembly.

5. A drain repair apparatus as in claim 4 wherein said lower collar assembly further comprises a depression defined by said outer surface of said lower collar assembly, such that said tabs may be folded within said depression.

6. A drain repair apparatus as in claim 5 further comprising a flat drain cover.

7. A drain repair apparatus for use in a water receptacle defining a drain hole installed over a drain pipe said drain repair apparatus comprising:
    a lower collar assembly for placement through said drain hole and about said drain pipe;
    an upper collar assembly having flange section larger than said drain hole;
    a means of sealing said upper collar assembly to said lower collar assembly about said drain pipe;
    at least two or more tabs pivotally attached to the outside of said lower collar assembly along an axis parallel to said drain pipe; and
    a fastener means for connecting said upper collar assembly to said lower collar assembly and for rotationally engaging said tabs thereby the rotation of said fasteners means engages and moves sail tabs in an outward fashion such that said repair apparatus is held in a desired position within said drain hole by said tabs.

8. A drain repair apparatus as in claim 7 wherein said means for sealing said upper collar assembly to said lower collar assembly is at least one O-Ring.

9. A drain repair apparatus as in claim 8 wherein said tabs have a threaded female portion.

10. A drain repair apparatus as in claim 9 wherein said fastener means for connecting said upper collar assembly to said lower collar assembly is a plurality of elongate threaded fasteners said fasteners being threaded through said upper assembly, and into said lower assembly and are threaded through said threaded female portion of said tab.

11. A drain repair apparatus as in claim 10 wherein said lower collar assembly further comprises a depression defined by said outer surface of said lower collar assembly, such that said tabs may be folded within said depression.

12. A drain repair apparatus as in claim 5 further comprising a flat drain cover.

* * * * *